US012638049B2

(12) United States Patent  (10) Patent No.: US 12,638,049 B2
Carrasco et al.  (45) Date of Patent: May 26, 2026

(54) MAGNETIC BEARING MODULE HAVING A MAGNETIC BEARING

(71) Applicant: SKF Magnetic Mechatronics, Saint-Marcel (FR)

(72) Inventors: Eduardo Carrasco, Saint Etienne sous Bailleul (FR); Julien Vauby, Rouen (FR); Nicolas Polo, Taverny (FR); Eddy Herisse, les Andelys (FR)

(73) Assignee: SKF Magnetic Mechatronics

( * ) Notice: Subject to any disclaimer, the term of this patent is extended or adjusted under 35 U.S.C. 154(b) by 211 days.

(21) Appl. No.: 18/521,559

(22) Filed: Nov. 28, 2023

(65) Prior Publication Data

US 2024/0183393 A1 Jun. 6, 2024

(30) Foreign Application Priority Data

Dec. 6, 2022 (FR) ..................................... 2212796

(51) Int. Cl.
*F16C 32/04* (2006.01)

(52) U.S. Cl.
CPC ........ *F16C 32/0446* (2013.01); *F16C 32/047* (2013.01)

(58) Field of Classification Search
CPC ................ F16C 32/0446; F16C 32/047; F16C 32/0461; F16C 32/0402; F16C 32/0474; F16C 43/00; F16C 32/0406; F16C 19/52; F16C 41/007
USPC ....................................................... 310/90.5
See application file for complete search history.

(56) References Cited

U.S. PATENT DOCUMENTS

| | | | | |
|---|---|---|---|---|
| 5,310,311 A | * | 5/1994 | Andres | F02C 6/06 |
| | | | | 415/214.1 |
| 7,471,022 B2 | * | 12/2008 | Sortore | F16C 32/0489 |
| | | | | 310/216.022 |
| 10,851,835 B2 | | 12/2020 | Zhang et al. | |
| 2016/0178005 A1 | * | 6/2016 | Baucé | F16C 32/047 |
| | | | | 310/90.5 |

(Continued)

FOREIGN PATENT DOCUMENTS

| | | |
|---|---|---|
| CN | 212055517 U | 12/2020 |
| CN | 212455466 U | 2/2021 |

(Continued)

OTHER PUBLICATIONS

Preliminary Search Report of the National Intellectual Property Office of France in Application No. FR2212796 dated Jun. 27, 2023; 8pgs.

*Primary Examiner* — Ahmed Elnakib
(74) *Attorney, Agent, or Firm* — Stinson LLP

(57) ABSTRACT
A magnetic bearing module (1) having a position sensor (2) and a magnetic bearing (3) is disclosed. One of a connection face (5, 6) of the position sensor (2) and a connection face (9) of the magnetic bearing (3) is provided with three pegs (22, 23, 24). Each peg has a shape exhibiting symmetry of revolution of which the axis (L22, L23, L24) is parallel to the axis (L1) of the module (1). The angular spacing between the first peg (22) and the second peg (23) is 90°. The angular spacing between the second peg (23) and the third peg (24) is 90°. The other of the connection face (5, 6) of the position sensor (2) and the connection face (9) of the magnetic bearing (3) has three accommodating notches (32, 33, 34) inside each of which is mounted one of the three pegs (22, 23, 24).

37 Claims, 7 Drawing Sheets

(56)          References Cited

U.S. PATENT DOCUMENTS

2024/0183393  A1 *   6/2024  Carrasco ............. F16C 32/0461

FOREIGN PATENT DOCUMENTS

EP          3026277  A1     6/2016
EP          3026278  A1     6/2016
EP          3652456  B1     6/2021

* cited by examiner

MAGNETIC BEARING MODULE HAVING A MAGNETIC BEARING

CROSS-REFERENCE TO RELATED APPLICATION

This application claims priority to French Application No. 2212796, filed Dec. 6, 2022, the entirety of which is hereby incorporated by reference.

FIELD

The present disclosure relates to systems provided with a magnetic bearing module, which has a position sensor and a magnetic bearing, and more particularly to the magnetic bearing module.

BACKGROUND

A magnetic bearing module of a system, such as an industrial machine, conventionally comprises a position sensor and one or more magnetic bearings. Generally, the magnetic bearing comprises an axial half-bearing and a radial bearing. In certain cases, the magnetic bearing comprises a radial bearing and an emergency rolling bearing, or an axial bearing unit and an emergency rolling bearing. The cooperation of the sensor with the one or more bearings targets precise guiding of a shaft by the module, even in the case of strong load, high rotational speed, or various constraints such as vibrations, temperature variations, or the like. It is a question of conserving precise guiding in all the phases of use of the system. To this end, it is important that the offset between the axis of the position sensor and the axis of each bearing is very small, or even zero. In other words, the precision in the production of the magnetic bearing module is important.

In order to satisfy the conditions mentioned above, the prior art has proposed the following arrangements.

First of all, the mounting of the measuring components of the position sensor in the housing of the latter. If the mounting is tight, the functional clearances are zero and the precision depends on the geometry of the pieces. If the mounting is not tight, then machining of all the components, after assembly thereof, imparts its precision to the position sensor.

Next, the association of the position sensor with each magnetic bearing. In order to obtain the best possible centering of the sensor with the bearing, it is known to create either a sliding mounting or a tight mounting.

If the mounting is of sliding nature, then the clearances that result from the manufacturing tolerances determine the offset between the axis of the position sensor and the axis of a bearing. This offset, although generally small, impairs the precision with which a shaft is guided by the module.

If the mounting is tight then the offset, as mentioned for the sliding mounting, does not exist. There may nevertheless be observed an offset resulting from the shape of the pieces, in relation to the manufacturing tolerances thereof. In addition, still for tight mounting, it is apparent that mechanical constraints are exerted on the components of the bearing module. These constraints are often of variable intensity as a result of the operating temperatures for which the modules are intended, but also in relation to the various materials used in the assembly.

The prior art does not therefore provide a completely satisfactory solution as regards the guiding of a shaft, or of a similar piece, by a module provided with a magnetic bearing.

As has been seen, in certain cases the components of the module are essentially subjected to the forces linked to clamping, the precision of the guiding function being reduced by the deformations brought about by the assembly forces. In other cases, as has also been seen, the guiding precision is very dependent on the assembly clearances. In other words, no known magnetic bearing module combines the qualities of guiding precision.

SUMMARY

One aim of the present disclosure is to improve the guiding precision of a magnetic bearing module provided with one or more magnetic bearings.

Other aims of the present disclosure are, in particular: to make it easier to assemble the constituent pieces of the module, to obtain and conserve the alignment between the axis of the position sensor and the axis of each bearing.

To this end, the present disclosure proposes a magnetic bearing module having a position sensor and a magnetic bearing, the position sensor having a first connection face, the magnetic bearing having a connection face mounted axially in contact with the first connection face of the position sensor. One of the first connection face of the position sensor and the connection face of the magnetic bearing is provided with three pegs, each peg having a shape exhibiting symmetry of revolution of which the axis is parallel to the axis of the module, the angular spacing between the first peg and the second peg being 90°, the angular spacing between the second peg and the third peg being 90°, the other of the first connection face of the position sensor and the connection face of the magnetic bearing having three accommodating notches inside each of which is mounted one of the three pegs.

This arrangement means that it is easy to assemble the constituent pieces of the module, whether by hand or using dedicated machines. The arrangement also means that the alignment between the axis of the position sensor and the axis of the bearing is very precise.

This advantageously results in the guiding precision of the module being improved.

The present disclosure goes further and proposes a magnetic bearing module wherein the position sensor has a second connection face opposite the first connection face, the module also comprising a complementary bearing having a connection face mounted axially in contact with the second connection face of the position sensor and having three accommodating notches inside each of which is mounted one of the three pegs. The complementary bearing may be an emergency bearing, an axial half-bearing, an axial bearing unit with emergency rolling bearing or any other component of a rotary machine that needs to be centered with the axis of the shaft.

Here again, it is easy to assemble the constituent pieces of the module. The alignment between the axis of the position sensor and the axis of the complementary bearing is very precise. In addition, if the complementary emergency bearing is mechanical, the magnetic bearing is preserved when its electrical power supply is interrupted.

Furthermore, the position sensor is provided with pegs that project axially on either side of the first and second connection faces. This reduces the number of pieces necessary to connect two bearings to the same sensor.

The respective axis of each peg is at the same distance from the axis of the module. An advantage that results from this arrangement is simplification in terms of manufacture.

The connection face of the magnetic bearing has a fourth accommodating notch inside which may be mounted one of the three pegs. This makes it possible to adjust the angular position of the magnetic bearing or of any other component with respect to the position sensor.

Each notch has an elongate shape, along a radius R parallel to the first or second connection face of the position sensor, or to the connection face of the magnetic bearing, or to the connection face of the complementary bearing, passing through the axis of the module. This notch shape makes manufacture easier.

Each peg is an essentially cylindrical piece exhibiting symmetry of revolution, and each notch has edges parallel to the radius that denotes its length. These shapes make it easier to assemble a bearing with the position sensor.

The functional clearance between a peg and the associated notch is of close sliding nature. This increases the precision of the assembly.

All the pegs have the same diameter, and all the notches have the same width. This makes manufacture easier, and less expensive.

A space is provided between each peg and the associated notch, on the side of the axis of the module. In other words, there is a space between the peg and the bottom of the notch. It follows that the differences in expansion of the bearing and of the position sensor do not generate mechanical constraints additional to those that are due to the intended use.

The present disclosure also relates to a system comprising a magnetic bearing module, which has a position sensor and a magnetic bearing.

BRIEF DESCRIPTION OF THE DRAWINGS

Further aims, features and advantages of the present disclosure will become apparent from reading the following description, which relates to a non-limiting embodiment, with reference to the appended drawings, in which.

4

Figure 14:
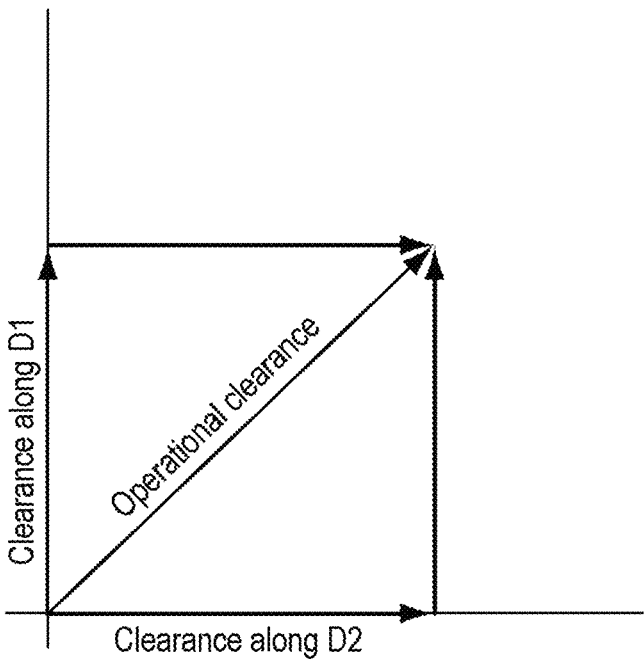

FIG. 14 is a diagram that depicts the level of precision of the assembly of a bearing with the position sensor.

DETAILED DESCRIPTION

Figure 1:
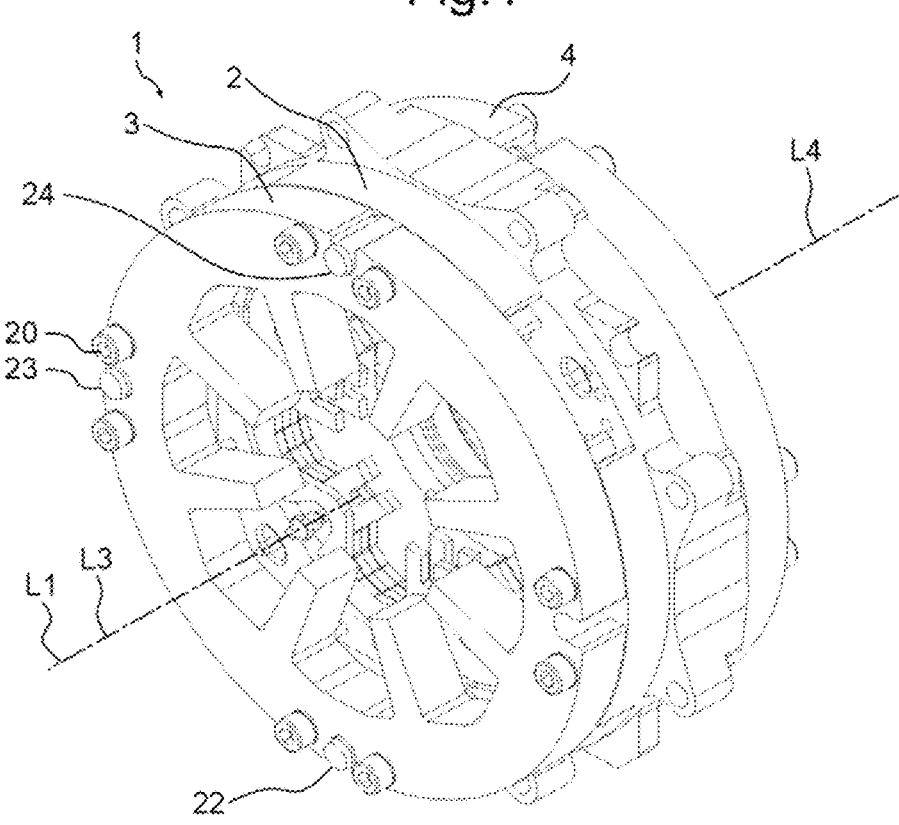
FIG. 1 is a perspective view of a magnetic bearing module, according to the proposed embodiment.
Figure 2:
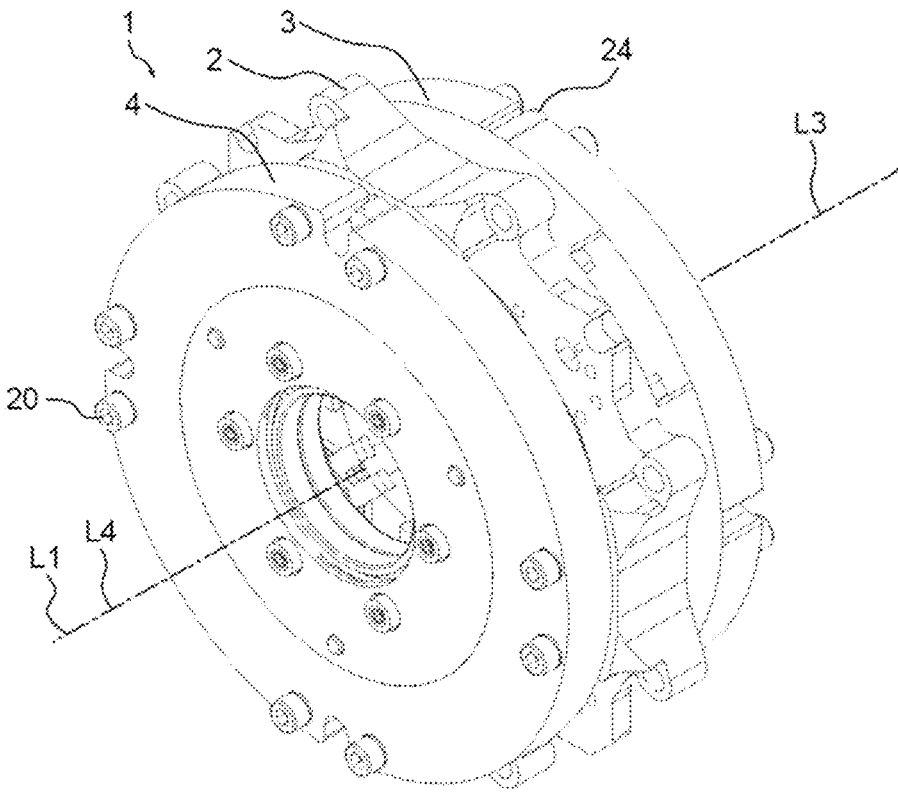
FIG. 2 is similar to FIG. 1, from another angle.

With reference first of all to FIGS. 1 and 2, a magnetic bearing module 1, according to the proposed embodiment, comprises a position sensor 2, magnetic bearing 3, and a complementary bearing 4. The magnetic bearing module 1 extends along an axis of rotation L1, so as to guide a shaft that has not been depicted. The shaft in the general sense is a solid or hollow piece exhibiting symmetry of revolution. Depending on the requirements, the complimentary bearing 4 may also be a magnetic bearing or, alternatively, a mechanical bearing. If it is magnetic bearing, it may be axial, or the like. If it is mechanical bearing, then it comprises elements such as rolling bearings, for example ball bearings, roller bearings, or any equivalent. The mechanical bearing may also comprise various mechanical components such as turbine volute elements, compressor elements, or the like. The use of the mechanical bearing ensures guiding of the shaft in the event of momentary or long-lasting absence of the magnetic field in the magnetic bearing 3. Thus, the onset of damage in the module 1 is avoided. In particular, the structure of the magnetic bearing 3 is preserved.

Figure 3:
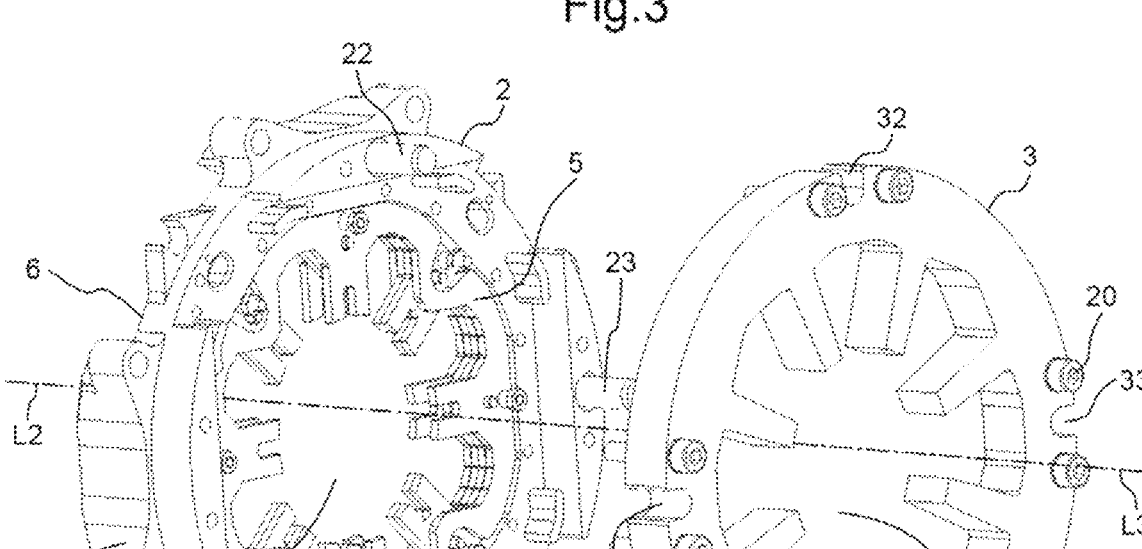
FIG. 3 is an exploded perspective view, which shows a position sensor and a magnetic bearing.
Figure 4:
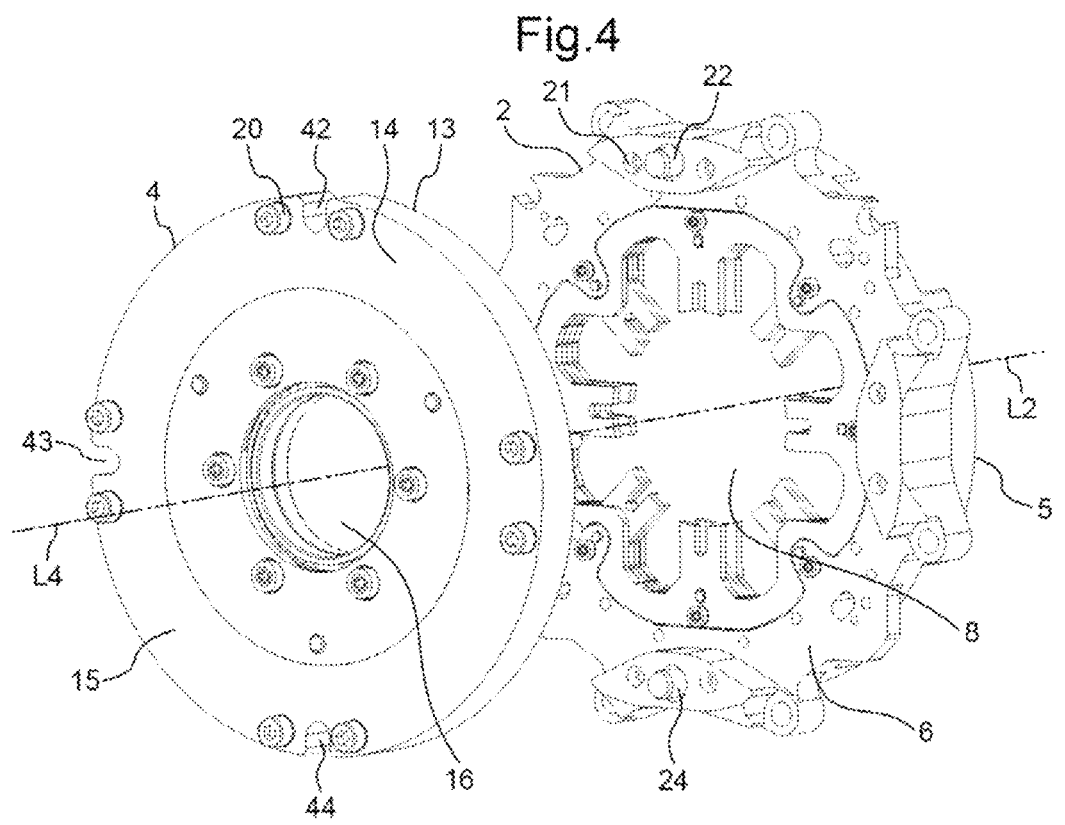
FIG. 4 is an exploded perspective view, which shows the position sensor and a complementary bearing.

Considering FIGS. 3 and 4, it can be seen that the position sensor 2 extends along an axis L2, and has a first connection face 5 and a second connection face 6, the faces 5, 6 being mutually parallel and perpendicular to the axis L2. The faces 5, 6 delimit the axial thickness of the sensor 2. The latter 2 comprises a body 7 that extends between the faces 5, 6, the body being structured so as to receive various elements necessary for the operation of the sensor. These elements have not been depicted. The sensor 2 has an axial opening 8 that passes through it, and that therefore passes through the body 7, between the faces 5, 6, along the axis L2. The opening 8 allows the passage of the shaft.

Next, the magnetic bearing 3 extends along an axis L3, and has a connection face 9 and a free face 10, the faces 9, 10 being mutually parallel and perpendicular to the axis L3. The faces 9, 10 delimit the axial thickness of the magnetic bearing 3. The latter 3 comprises a body 11 that extends between the faces 9, 10, the body being structured so as to receive various elements necessary for the operation of the bearing. These elements have not been depicted. The magnetic bearing 3 has an axial opening 12 that passes through it, and that therefore passes through the body 11, between the faces 9, 10, along the axis L3. The opening 12 allows the passage of the shaft.

In the same spirit, the complementary bearing 4 extends along an axis L4, and has a connection face 13 and a free face 14, the faces 13, 14 being mutually parallel and perpendicular to the axis L4. The faces 13, 14 delimit the axial thickness of the complementary bearing 4. The latter 4 comprises a body 15 that extends between the faces 13, 14, the body being structured so as to receive various elements necessary for the operation of the bearing. These elements have not been depicted. The complementary bearing 4 has an axial opening 16 that passes through it, and that therefore passes through the body 15, between the faces 13, 14, along the axis L4. The opening 16 allows the passage of the shaft.

All of FIGS. 1 to 4 make it possible to understand how the position sensor 2 and the bearings 3, 4 are secured to one another. These elements 2, 3, 4 are joined by clamping means, which are in this case screwing means. In a non-limiting manner, screws 20 hold the magnetic bearing 3 on the position sensor 2, and screws 20 hold the complementary bearing 4 on the position sensor 2. In order to receive the screws 20, the position sensor 2 has threaded orifices 21. Securing with screws is simple, inexpensive and reversible. Among the resulting advantages, mention may be made of the low cost, the ease of maintenance and the modularity. It is easy to replace a worn component, or to select one of them according to choice from a range.

Alternatives to the screwing means are possible: for example cam devices, bayonet mountings, a series of rivets, or any equivalent.

Figure 5:
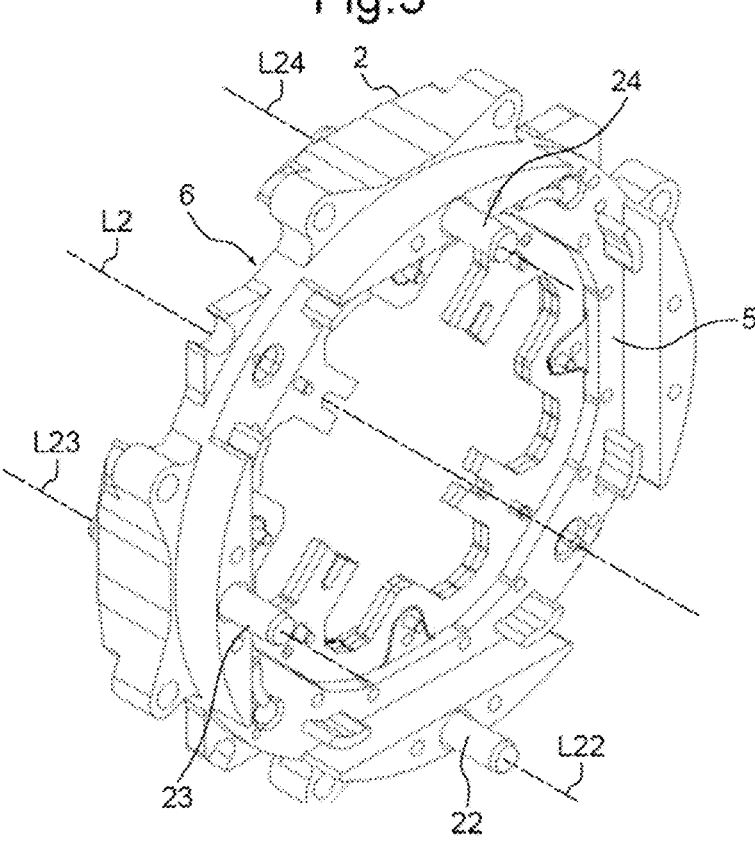
FIG. 5 is a perspective view of the position sensor, from the side of a first connection face.
Figure 6:
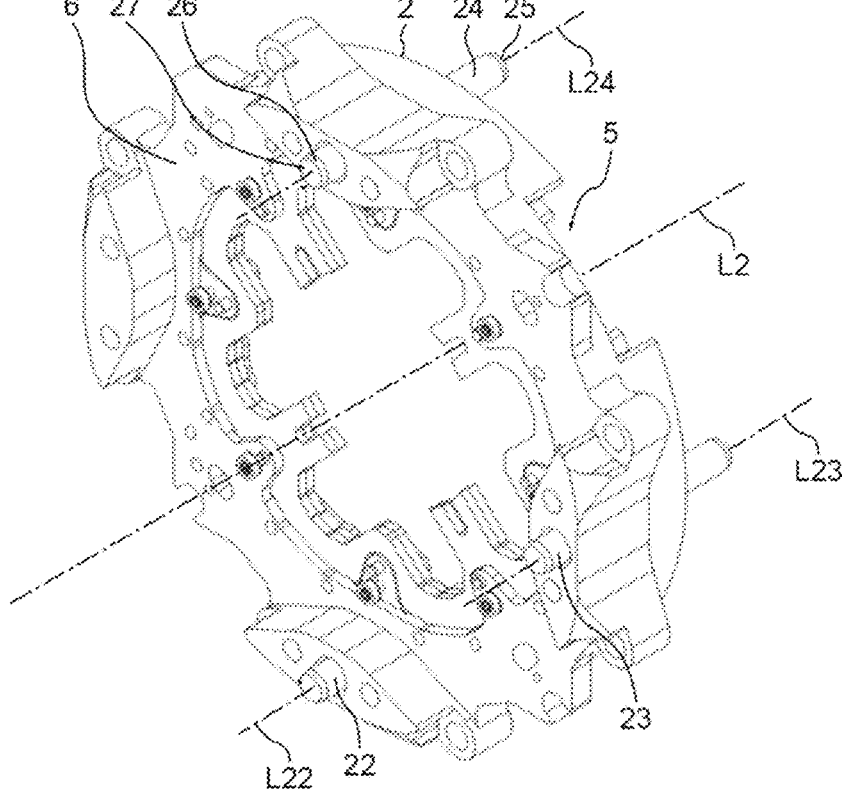
FIG. 6 is a perspective view of the position sensor, from the side of a second connection face.

Securing is one thing, but it is important that the constituent elements of the module 1 are positioned precisely with respect to one another. To this end, in accordance with the present disclosure and with reference now to FIGS. 5 and 6, a first peg 22, a second peg 23 and a third peg 24 are fastened to the position sensor 2. The pegs are differentiated by their references in order to make the description clearer. In a non-limiting manner, each peg 22, 23, 24 is attached to the body 7 of the position sensor 2. Each peg is a piece exhibiting symmetry of revolution, in this case a cylinder of essentially regular section, respectively of axis L22, L23, L24. This means that the longest part of the length of each peg is of constant diameter, even if its ends 25, 26 narrow. In this case the ends have a chamfer 27. It will be seen more clearly below that this feature makes it easier to assemble the bearings 3, 4 with the sensor 2.

Each peg 22, 23, 24 is inserted into the sensor 2, passing through the first connection face 5 and the second connection face 6, being perpendicular to the faces 5, 6, and being parallel to the axis L2. In other words, the axis L22, L23, L24 of each peg 22, 23, 24 is parallel to the axis L2 of the position sensor 2. This feature makes it possible to put the bearings 3, 4 in place on the sensor 2 easily and precisely.

In order to insert the pegs into the sensor, the body 7 of the latter is pierced by any known means, such as a machine equipped with drill bits. Next, the pegs are introduced into the piercing orifices. The immobilization of a peg in its housing, i.e. in the piercing orifice, is obtained by any means. In a non-limiting manner, for the embodiment described, a peg 22, 23, 24 is immobilized in its housing by a clamping effect. The manufacturing tolerances of the peg and of the pierced orifice allow forced introduction and immobilization by friction.

The length of each page 22, 23, 24 is greater than the thickness of the body 7 of the position sensor 2, the thickness being the distance between the first connection face 5 and second connection face 6. This results in each peg 22, 23, 24 projecting on the first connection face 5 and on the second connection face 6.

Figures 7, 8:
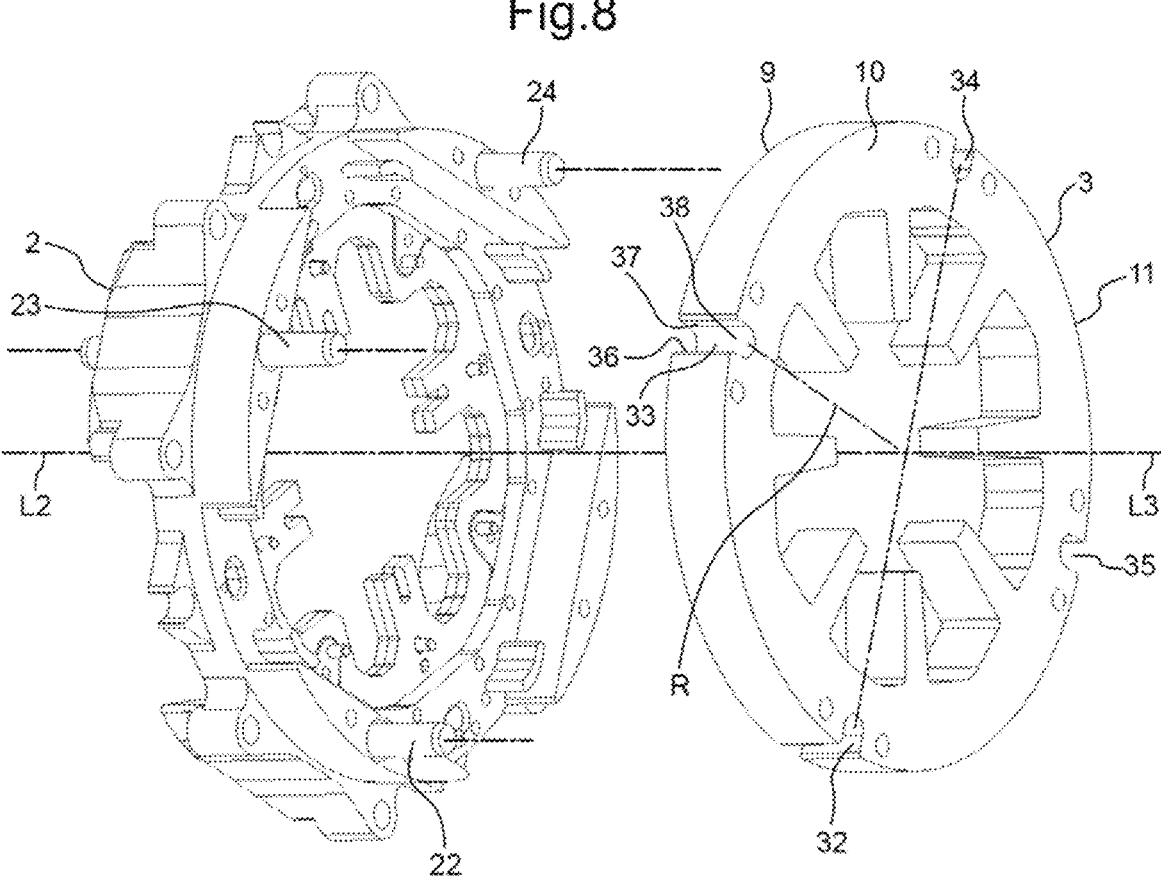
FIG. 7 is a flat view of the connection sensor from the side of the first connection face.
FIG. 8 is an exploded perspective view in relation to the assembly of the sensor with the magnetic bearing.

The distribution of the pegs on the sensor 2 is visible in FIG. 7. The angular spacing between the first peg 22 and the second peg 23 is 90°, and the angular spacing between the second peg 23 and the third peg 24 is 90°. As a result, the first peg 22 and the third peg 24 are diametrically opposite one another with respect to the axis L2 of the sensor 2, the axes L22, L23 and L24 being aligned along a straight line D1. The second peg 23 is situated on a straight line D2 perpendicular to D1 and passing through the axis of the sensor 2. The axis L23 of the second peg 23 is on D2. It will be seen more clearly below that this distribution of the pegs imparts great precision of assembly with each bearing.

The respective axis of each peg 22, 23, 24 is at the same distance from the axis L2 of the position sensor 2, and each peg has the same diameter. This simplifies manufacture.

In order to receive the pegs, with reference now to FIG. 8, the magnetic bearing 3 has accommodating notches 32, 33, 34, 35. The latter are differentiated by their references in order to make the description clearer. The magnetic bearing 3 thus has a first notch 32, a second notch 33, a third notch 34, and a fourth notch 35. Each of the first notch 32, second notch 33 and third notch 34 respectively accommodates the first peg 22, the second peg 23 and the third peg 24. The fourth notch 35 remains empty. An additional notch, in this case the fourth, makes it possible to select an angular position for putting the bearing in place on the sensor. The three pegs sit in three out of four notches. The reason is simple: the magnetic bearing 3 is supplied with electricity. By adjusting the angular position of the latter, the position of the electrical connection is optimized. This improves the ergonomics of a machine equipped with a magnetic bearing module 1.

In the same spirit as for the magnetic bearing 3, with reference to FIG. 4, the complementary bearing 4 has accommodating notches 42, 43, 44. Here again, the latter are differentiated by their references. The complementary bearing 4 thus has a first notch 42, a second notch 43, and a third notch 44. Each of the first notch 42, second notch 43 and third notch 44 respectively accommodates the first peg 22, the second peg 23 and the third peg.

With reference in combination to FIG. 4 and FIG. 8, each notch 32, 33, 34, 35, 42, 43, 44 has an elongate shape along a radius R, parallel to the connection face 9 and passing through the axis L3 of the magnetic bearing 3, or parallel to the connection face 13 and passing through the axis L4 of the complementary bearing 4. For each bearing 3, 4, the angular spacing between the first notch 32, 42 and the second notch 33, 43 is 90°, and the angular spacing between the second notch 33, 43 and the third notch 34, 44 is 90°. For the magnetic bearing 3, the angular spacing between the third notch 34 and the fourth notch 35 is 90°. As referenced for example for the second notch 33 of the magnetic bearing 3, but in the knowledge that this applies to all of them, each notch 32, 33, 34, 35, 42, 43, 44 has edges 36, 37 parallel to the radius R that denotes its length, and a bottom 38 situated on the side of the axis L3, L4 of the bearing 3, 4. The edges 36, 37 are also mutually parallel, parallel to the axis L3 of the bearing 3 or to the axis L4 of the bearing 4, and perpendicular to the connection face 9 and to the free face 10, or perpendicular to the connection face 13 and to the free face 14. Each notch passes through the body 11, 15 of the bearing 3, 4, being open on the side of the connection face 9, 13 and on the side of the free face 10, 14. Each notch is also open on the periphery of the body 11, 15. This makes it possible to perform precise finishing of the edges 36, 37, since it is easy to access the latter. It is easy to fashion each notch 32, 33, 34, 35, 42, 43, 44 so as to impart to each of its edges 36, 37 a surface state of low roughness, with a very small manufacturing tolerance. Thus the distance that separates the two edges 36, 37 is adjusted precisely, as will be better appreciated with an example given below.

Figures 9, 10, 11:
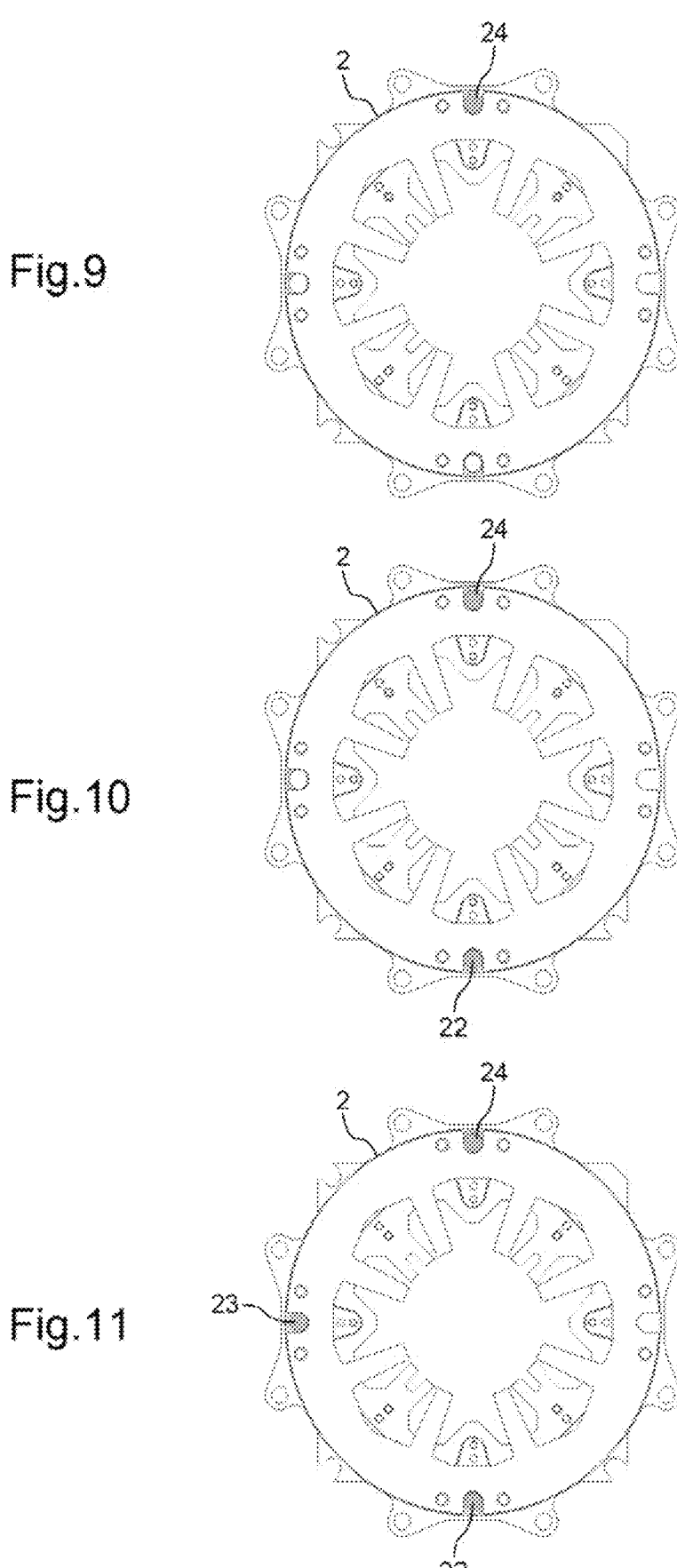
FIG. 9 is a schematic view that shows the effect produced by a single peg for the connection of a bearing to the position sensor.
FIG. 10 is a schematic view that shows the effect produced by two pegs for the connection of a bearing to the position sensor.
FIG. 11 is a schematic view that shows the effect produced by three pegs for the connection of a bearing to the position sensor.

As shown by FIGS. 9, 10, 11, even if this is in a non-limiting manner, the magnetic bearing module 1 comprises strictly three pegs. FIG. 9 shows that if only one peg is in place, the bearing 3 is able to move in translation and in rotation. FIG. 10 shows that if two pegs are in place, the bearing 3 is able to move only in translation. FIG. 11 shows that if three pegs are in place, then the bearing is immobile and correctly positioned.

Figure 12:
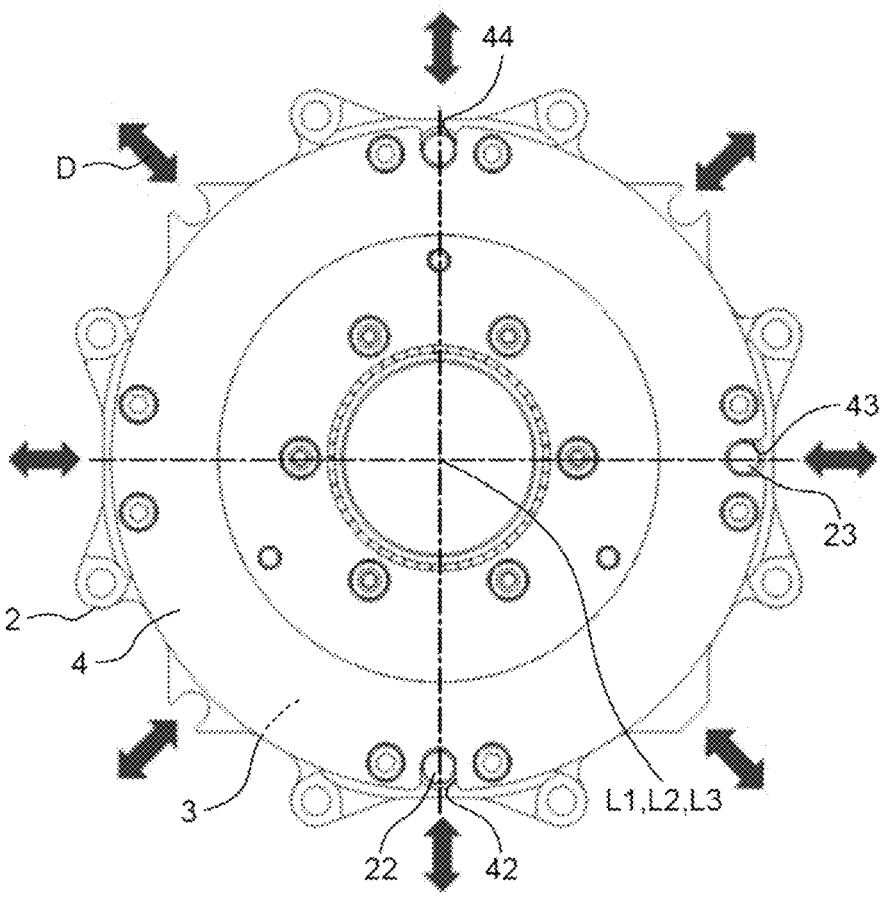
FIG. 12 is a side view of the magnetic bearing module, which shows the effect produced by a variation in temperature.
Figure 13:
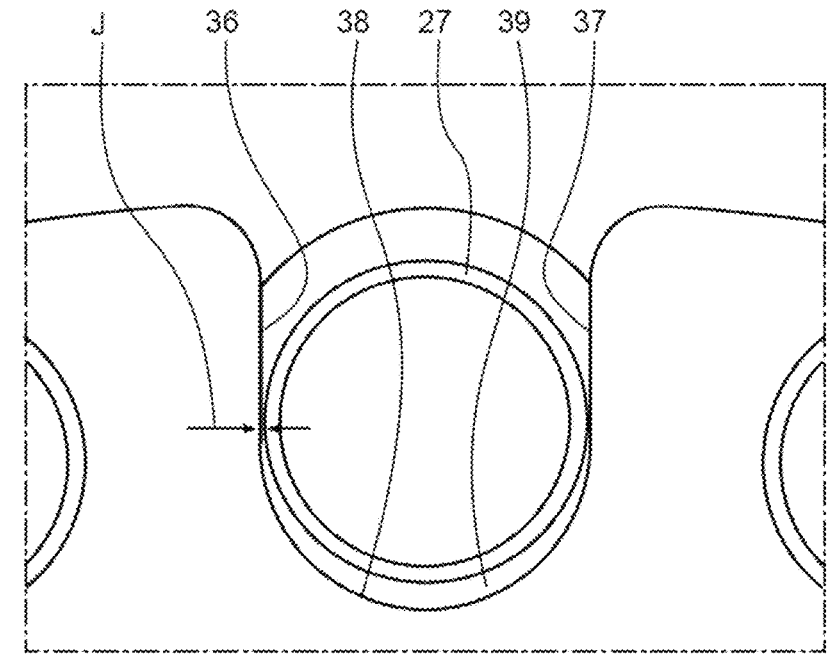
FIG. 13 is an enlarged partial view of FIG. 12.

It can be seen in FIGS. 12 and 13, with an enlargement regarding the third peg 24 and the third notch 34 of the magnetic bearing, that there is a free space 39 between the peg 24 and the bottom 38 of the notch 34. In general, there is a free space 39 between each peg and the bottom 38 of the notch in which it sits, after assembly of the bearing 3, 4 with the sensor 2. This allows small movements of a peg in the notch, in a radial direction of the device, i.e. in a direction depicted by a radius R perpendicular to the axis L1 of the module 1. This direction R is, as has been seen, perpendicular to the axes L2, L3 of the sensor 2 and of the bearing 3. The direction R is also parallel to the edges 36, 37 of the notch. The small movements in question, which are depicted by arrows D, result from the variations in temperature of the sensor 2 and of the bearing 3. Specifically, the differences in structures, and optionally materials that constitute them, mean that the sensor and the bearing are not deformed in the same way with the increases or decreases in temperature.

Still in relation to FIGS. 12 and 13, a functional clearance between the third peg 24 and the edges 36, 37 of the third notch 34 is referenced by the letter J. The same clearance J is provided for each peg in its accommodating notch. Still according to the embodiment described, the peg 22, 23, 24 is a cylinder made with an ISO h6 manufacturing tolerance. This means that for a diameter of up to 10 mm, the tolerance is 9 μm. The corresponding notch 32, 33, 34, for its part, is made with an ISO H7 manufacturing tolerance. This means that for a width of up to 10 mm, the tolerance is 15 μm. Consequently, the maximum clearance J is 24 μm (9+15). It is a question of a close sliding assembly. Considering FIG. 7, in addition to FIGS. 12 and 13, the effect produced by the functional dimensioning is understood; when the bearing is put in place on the sensor, the maximum relative movement of one with respect to the other is 24 μm in a direction perpendicular to D1, i.e. along D2, and also 24 μm in a direction perpendicular to D2, i.e. along D1. After assembly, the operational clearance between the bearing and the sensor is given by the following formula, in relation to FIG. 14: operational clearance=$\sqrt{24^2+24^2}$=33.9 μm. To within one tenth, the operational clearance is 34 μm.

In comparison with the present disclosure, the prior art provides coaxial assemblies with h6-H7 tolerance for surfaces exhibiting symmetry of revolution situated towards the periphery of the components, i.e. for diameters much larger than those of a peg. The prior art has to make do with tolerances that often relate to diameters greater than 150 mm, and this leads to an operational clearance at least equal to 84 μm. The present disclosure rather relates to values of 5 to 15 mm for the pegs and the notches. It can therefore be said that the present disclosure divides the operational clearance for the mounting of a bearing on a sensor by more than two. In other words, the present disclosure substantially improves the precision of assembly of the components of a magnetic bearing module.

In addition, the specific arrangement of the pegs 22, 23, 24, along the lines D1 and D2 as has been seen above, dissociates the effects following the thermal expansions from the effects produced by the manufacturing tolerances. The respective axes L2, L3, L4 of the sensor 2 and of the bearings 3, 4 conserve their alignment, or their slight offset if there is one, regardless of the temperature of the magnetic bearing module 1. This results in the precision of the module 1 remaining constant throughout all the phases of use. Finally, with the present disclosure, the guiding precision is both better and permanent.

The present disclosure is not limited to the embodiment described, and relates to all the technical equivalents included in the scope of the claims that follow.

In particular, it may be provided that pegs are fastened to one or both bearings, and that the position sensor has notches for accommodating the pegs.

What is claimed is:

1. A magnetic bearing module comprising:
a position sensor having a first connection face; and
a magnetic bearing having a connection face mounted axially in contact with the first connection face of the position sensor;
wherein one of the first connection face of the position sensor and the connection face of the magnetic bearing is provided with three and only three pegs, each peg having a shape exhibiting symmetry of revolution of which the axis is parallel to the axis of the module, an angular spacing between the first peg and the second peg being 90°, an angular spacing between the second peg and the third peg being 90°, the other of the first connection face of the position sensor and the connection face of the magnetic bearing has three accommodating first notches inside each of which is mounted one of the three pegs.

2. The magnetic bearing module according to claim 1, wherein the position sensor has a second connection face opposite the first connection face, the module also comprising a complementary bearing having a connection face mounted axially in contact with the second connection face of the position sensor and having three accommodating second notches inside each of which is mounted one of the three pegs.

3. The magnetic bearing module according to claim 2, wherein the position sensor is provided with the pegs, the pegs projecting axially on either side of the first and second connection faces.

4. The magnetic bearing module according to claim 2, wherein the respective axis of each peg is at the same distance from the axis of the module.

5. The magnetic bearing module according to claim 4, wherein the connection face of the magnetic bearing includes the three first notches, and wherein the connection face of the magnetic bearing has a fourth accommodating first notch inside which can be mounted one of the three pegs.

6. The magnetic bearing module according to claim 5, wherein each first notch has an elongate shape along a radius parallel to the first or second connection face of the position sensor, or to the connection face of the magnetic bearing, or to the connection face of the complementary bearing.

7. The magnetic bearing module according to claim 6, wherein each peg is an essentially cylindrical piece exhibiting symmetry of revolution, and wherein each first notch has edges parallel to the radius that denotes a length of the first notch.

8. The magnetic bearing module according to claim 7, wherein a functional clearance between each peg and the associated first notch is of close sliding nature.

9. The magnetic bearing module according to claim 8, wherein all the pegs have the same diameter, and wherein all the first notches have the same width.

10. The magnetic bearing module according to claim 9, wherein a space is provided between each peg and the associated first notch, on the side of the axis of the module.

11. The magnetic bearing module according to claim 1, wherein the respective axis of each peg is at the same distance from the axis of the module.

12. The magnetic bearing module according to claim 1, wherein the connection face of the magnetic bearing includes the three first notches, and wherein the connection face of the magnetic bearing has a fourth accommodating first notch inside which can be mounted one of the three pegs.

13. The magnetic bearing module according to claim 1, wherein each first notch has an elongate shape along a radius parallel to the first connection face of the position sensor or to the connection face of the magnetic bearing.

14. The magnetic bearing module according to claim 13, wherein each peg is an essentially cylindrical piece exhibiting symmetry of revolution, and wherein each first notch has edges parallel to the radius that denotes a length of the first notch.

15. The magnetic bearing module according to claim 1, wherein a functional clearance between each peg and the associated first notch is of close sliding nature.

16. The magnetic bearing module according to claim 1, wherein all the pegs have the same diameter, and wherein all the first notches have the same width.

17. The magnetic bearing module according to claim 1, wherein a space is provided between each peg and the associated first notch, on the side of the axis of the module.

18. The magnetic bearing module according to claim 1, wherein each first notch has a radially extending elongated shape.

19. The magnetic bearing module according to claim 1, wherein each first notch includes an open side on an outer circumferential periphery of said other of the first connection face of the position sensor and the connection face of the magnetic bearing.

20. The magnetic bearing module according to claim 1, wherein each first notch has opposing planar edges, each peg being disposed between the planar edges of the associated first notch each peg is mounted in.

21. The magnetic bearing module according to claim 1, further comprising a free space between each peg and the associated first notch each peg is mounted in, each free space being configured to permit movement in a radial direction of each peg in the associated first notch.

22. A magnetic bearing module comprising:

a position sensor having a first connection face and a second connection face opposite the first connection face;

a complementary bearing having a connection face mounted axially in contact with the second connection face of the position sensor; and a magnetic bearing having a connection face mounted axially in contact with the first connection face of the position sensor;

wherein one of the first connection face of the position sensor and the connection face of the magnetic bearing is provided with three pegs, each peg having a shape exhibiting symmetry of revolution of which the axis is parallel to the axis of the module, an angular spacing between the first peg and the second peg being 90°, an angular spacing between the second peg and the third peg being 90°, the other of the first connection face of the position sensor and the connection face of the magnetic bearing has three accommodating first notches inside each of which is mounted one of the three pegs;

wherein the connection face of the complementary bearing has three accommodating second notches inside each of which is mounted one of the three pegs.

23. The magnetic bearing module according to claim 22, wherein the position sensor is provided with the pegs, the pegs projecting axially on either side of the first and second connection faces.

24. The magnetic bearing module according to claim 23, wherein the respective axis of each peg is at the same distance from the axis of the module.

25. The magnetic bearing module according to claim 24, wherein the connection face of the magnetic bearing includes the three first notches, and wherein the connection face of the magnetic bearing has a fourth accommodating first notch inside which can be mounted one of the three pegs.

26. The magnetic bearing module according to claim 25, wherein each first notch has an elongate shape along a radius parallel to the first or second connection face of the position sensor, or to the connection face of the magnetic bearing, or to the connection face of the complementary bearing.

27. The magnetic bearing module according to claim 26, wherein each peg is an essentially cylindrical piece exhibiting symmetry of revolution, and wherein each first notch has edges parallel to the radius that denotes a length of the first notch.

28. The magnetic bearing module according to claim 27, wherein a functional clearance between a peg and the associated first notch is of close sliding nature.

29. The magnetic bearing module according to claim 28, wherein all the pegs have the same diameter, and wherein all the first notches have the same width.

30. The magnetic bearing module according to claim 29, wherein a space is provided between each peg and the associated first notch, on the side of the axis of the module.

31. The magnetic bearing module according to claim 22, wherein the respective axis of each peg is at the same distance from the axis of the module.

32. The magnetic bearing module according to claim 22, wherein the connection face of the magnetic bearing includes the three first notches, and wherein the connection face of the magnetic bearing has a fourth accommodating first notch inside which can be mounted one of the three pegs.

33. The magnetic bearing module according to claim 22, wherein each first notch has an elongate shape along a radius parallel to the first or second connection face of the position sensor, or to the connection face of the magnetic bearing, or to the connection face of the complementary bearing.

34. The magnetic bearing module according to claim 22, wherein each peg is an essentially cylindrical piece exhibiting symmetry of revolution, and wherein each first notch has edges parallel to the radius that denotes a length of the first notch.

35. The magnetic bearing module according to claim 22, wherein a functional clearance between each peg and the associated first notch is of close sliding nature.

36. The magnetic bearing module according to claim 22, wherein all the pegs have the same diameter, and wherein all the first notches have the same width.

37. The magnetic bearing module according to claim 22, wherein a space is provided between each peg and the associated first notch, on the side of the axis of the module.

* * * * *